United States Patent [19]
Frommelt et al.

[11] 3,935,684
[45] Feb. 3, 1976

[54] LOADING DOCK SHELTERS

[75] Inventors: Cyril P. Frommelt; Sylvan J. Frommelt, both of Dubuque, Iowa

[73] Assignee: Dubugue Awning & Tent Company, Dubuque, Iowa

[22] Filed: Dec. 12, 1974

[21] Appl. No.: 531,914

[52] U.S. Cl. .............................. 52/173 DS; 135/5 A
[51] Int. Cl.² ......................... E06B 1/56; E06B 7/22
[58] Field of Search .......... 52/173 DS, 52; 135/5 A; 49/462, 477, 488, 475, 491, 493; 14/71 A

[56] References Cited
UNITED STATES PATENTS

| | | |
|---|---|---|
| 2,704,574 | 3/1955 | Etlar .................................. 49/475 |
| 3,411,243 | 11/1968 | Baermann ......................... 49/493 X |
| 3,699,733 | 10/1972 | Frommelt et al. ............... 52/173 DS |

*Primary Examiner*—J. Karl Bell
*Attorney, Agent, or Firm*—Johnson, Dienner, Emrich & Wagner

[57] ABSTRACT

A loading dock shelter of the pad type, wherein the side pads thereof are movably mounted on brackets which are concealed.

10 Claims, 11 Drawing Figures

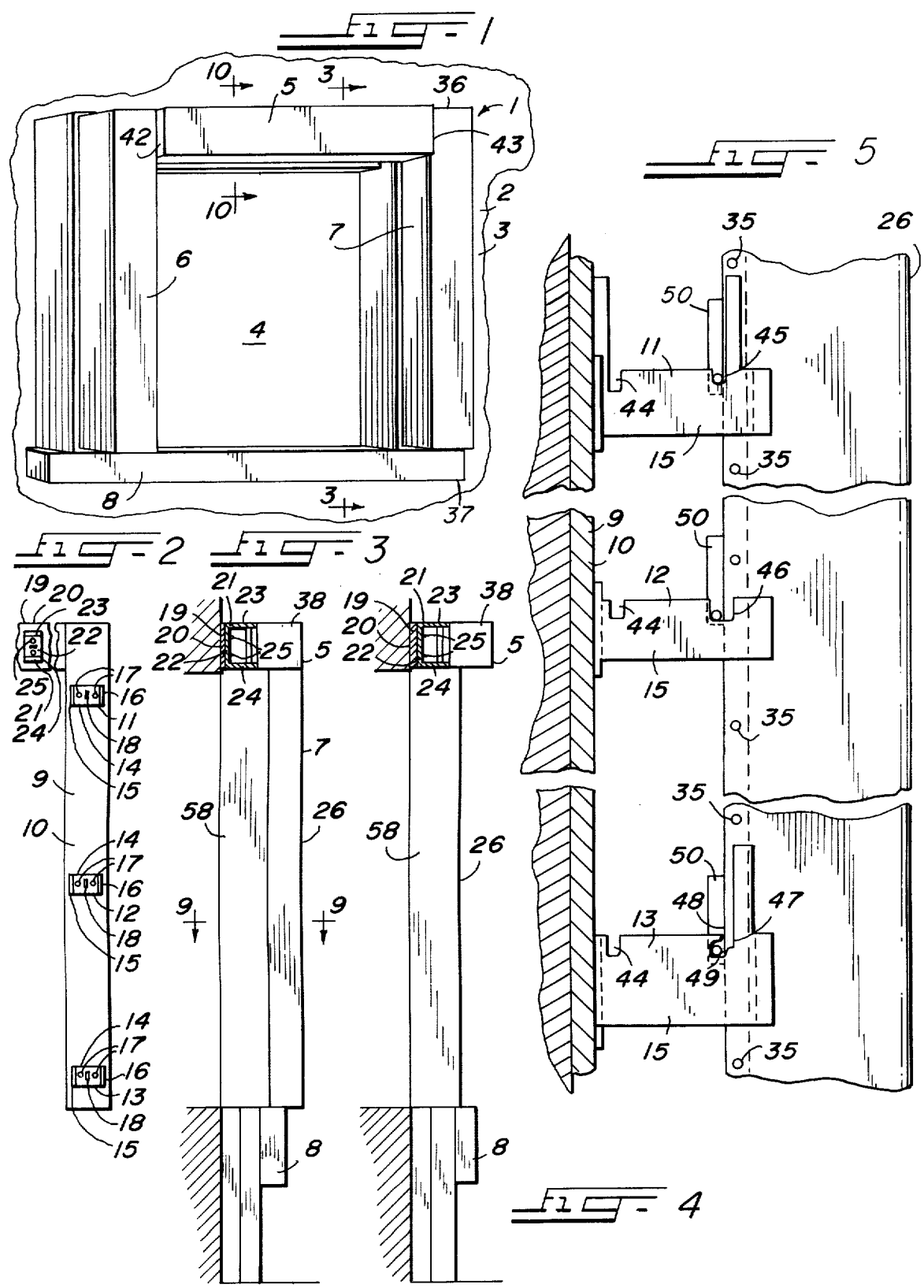

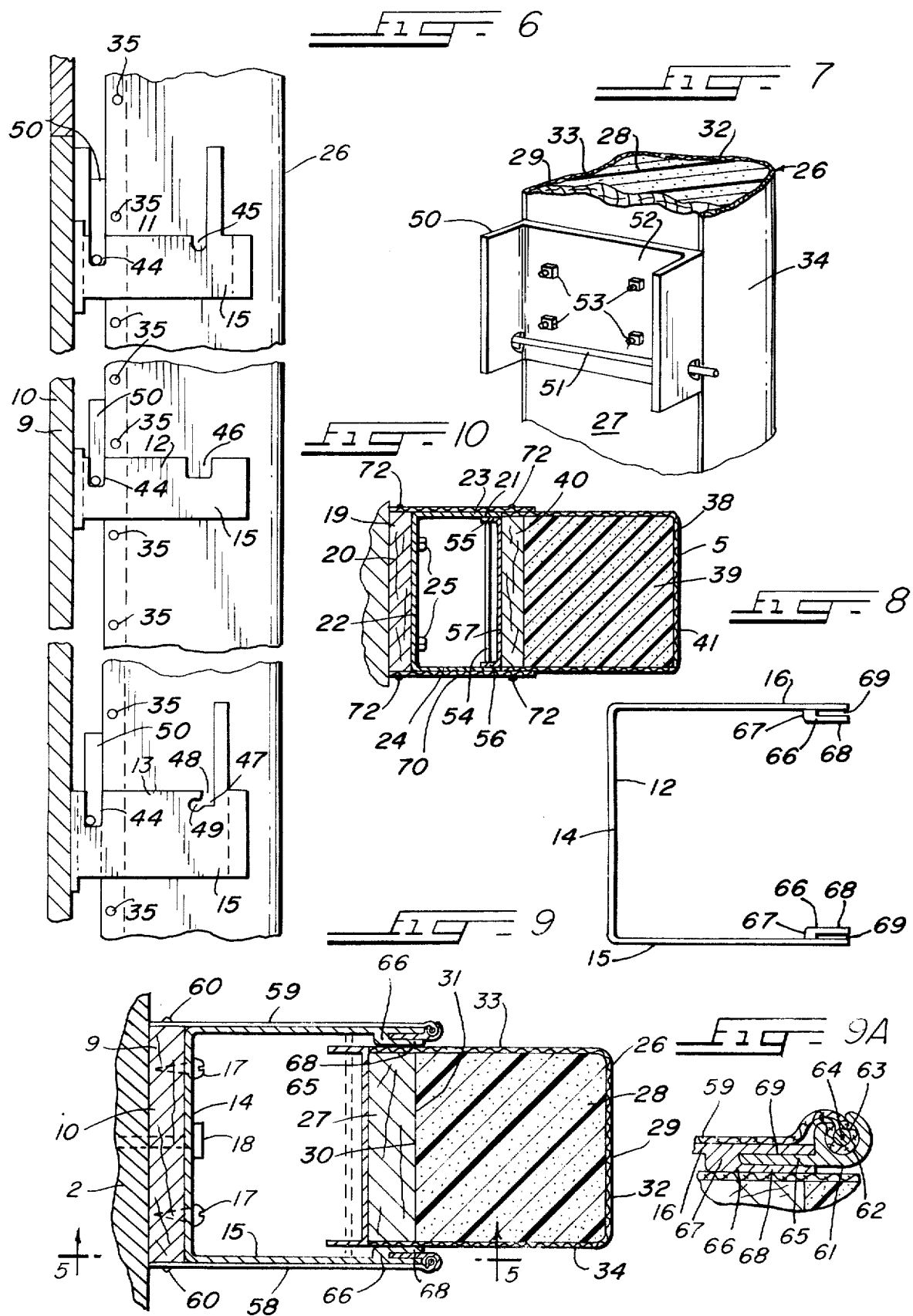

1

LOADING DOCK SHELTERS

BACKGROUND OF THE INVENTION

This invention relates to loading dock shelters and, more particularly, to loading dock shelters of the pad type.

It is a primary object of the present invention to enable loading dock pads to be mounted on warehouse walls in a novel and expeditious manner.

Another object of the present invention is to afford a novel loading dock shelter of the pad type as distinguished from the drape type, such as, for example, those shown in our U.S. Pat. Nos. 3,638,667 and 3,699,733.

Loading dock shelters of the general type, to which the broader aspects of the present invention pertains, and which embody side pads which are movably and adjustable, are shown in our copending application for U.S. Patent, Ser. No. 456,011, filed Mar. 29, 1974.

Another object of the present invention is to afford a novel mounting for movable or adjustable loading dock pads.

Another object is to afford a novel mounting bracket for supporting the side pads of loading dock seals embodying head pads and side pads disposed along the top and sides, respectively, of a doorway in a warehouse.

A further object of the present invention is to afford a novel structure for concealing mounting brackets used for supporting movable side pads of pad-type loading dock seals.

Another object is to afford a novel mounting for cover panels on the supporting structure for loading dock pads.

An object ancillary to the foregoing is to enable such cover panels to be effectively protected, in a novel and expeditious manner, against dislodgment from operative position on such supporting structure.

Another object is to afford a novel loading dock shelter which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front perspective view of a loading dock shelter embodying the principles of the present invention, showing the shelter disposed in operative position around a warehouse doorway;

FIG. 2 is a fragmentary, front elevational view of a portion of the loading dock shelter shown in FIG. 1, with the side pad and head pad removed to show underlying parts;

FIG. 3 is a detail sectional view taken substantially along the line 3—3, FIG. 1;

FIG. 4 is a detail sectional view, similar to FIG. 3, but showing the side pad in retracted position;

FIG. 5 4 is a fragmentary, detail sectional view taken substantially along the line 5—5 in FIG. 9;

FIG. 6 is a view similar to FIG. 5, but showing the parts of the loading dock shelter disposed in different operative position;

FIG. 7 is a fragmentary, rear perspective view of a portion of the loading dock shelter shown in FIGS. 5–6;

FIG. 8 is a top plan view of one of the mounting brackets shown in FIG. 5 and 6;

FIG. 9 is a detail sectional view taken substantially along the line 9—9 in FIG. 3;

FIG. 9A is an enlarged view of the retaining clip shown in FIG. 9; and

FIG. 10 is a detail sectional view taken substantially along the line 10—10 in FIG. 1.

DESCRIPTION OF THE EMBODIMENT SHOWN HEREIN

A loading dock shelter 1, embodying the principles of the present invention, is shown in the drawings to illustrate the presently preferred embodiment of the present invention. It is shown mounted on an outer wall 2 of a warehouse 3 in surrounding relation to a doorway 4 in the warehouse 3, FIGS. 1 and 2.

The loading dock shelter embodies, in general, a head pad 5 and two oppositely disposed side pads 6 and 7. In operation, the shelter 1 is mounted on the warehouse 3 in such a position that the head pad 5 is disposed above and extends along the doorway 4, and the side pads 6 and 7 are disposed laterally outwardly of, and extend along respective vertical sides of the doorway 4. An elongated bumper 8 is mounted on the warehouse wall 2 below the doorway 4 and the lower ends of the side pads 6 and 7, the bumper 8 projecting outwardly from the warehouse wall 2 and extending along the lower edge of the doorway 4, FIGS. 1, 3 and 4.

As will be discussed in greater detail presently, the side pads 6 and 7, like the side pads of the loading dock shelter shown in our aforementioned co-pending application, Ser. No. 456,011, are adjustable between one position, as shown in FIGS. 1 and 2, wherein they project outwardly beyond the bumper 8 into position to be operatively engaged by a rear end of a truck, not shown, which is to be loaded or unloaded through the doorway 4; and another position wherein they project outwardly from the wall to a lesser distance than the bumper 8, as shown in FIG. 3, so that they are protected against such engagement with such a truck by the bumper 8.

The side pads 6 and 7 are identical in construction. Each includes a supporting member 9, FIGS. 2, 5 and 6, embodying an elongated backing plate or backing member 10, having a plurality of mounting brackets 11, 12 and 13, projecting outwardly from one face thereof. The backing members 10 may be made of any suitable material, such as, for example, wood or steel, but preferably, are made from a suitable wooden member, such as, for example, wooden planking. The mounting brackets 11-13 may be made of any suitable material, such as, for example, mild steel, and each is substantially U-shaped in horizontally transverse cross-section. Each of the mounting brackets 11-13 embodies an elongated base member 14, from the opposite outer ends of which project two side members or legs 15 and 16, the latter being disposed in substantially parallel relation to each other, FIGS. 2, 8 and 9. The mounting brackets 11–13 on each of the bases 14 are secured to one face of the respective backing members 10 by suitable means such as screws or bolts 17, FIGS. 2 and 9. In the assembled loading dock shelter 1, the bases 14 are secured to the warehouse wall 2, on respective sides of the doorway 4, by suitable means, such as screws or bolts 18, which, preferably, extend through the bases 14 of the brackets 11–13, FIGS. 2 and 9. In the assembled loading dock shelter 1, the brackets 11–13 project directly outwardly away from the wall 2.

The head pad 5, like the side pads 6 and 7, includes a supporting member 19, embodying an elongated backing plate or backing member 20, having a plurality of mounting brackets 21 mounted on one face thereof in spaced relation to each other, one such bracket 21 being shown in FIGS. 3 and 4. The backing member 20, like the backing member 10, may be made of any suitable material, such as, for example, wood or steel, but, preferably, is made from a single wooden member, such as, for example, wooden planking.

All of the bracket members 21 are identical in construction, and each is substantially U-shaped in vertical, transverse cross-section, FIG. 2. Each embodies an elongated, vertically extending base member 22, from the upper and lower edge portions of which two side members or legs 23 and 24 project in substantially parallel relation to each other. The bracket 21 may be made of any suitable material, such as, for example, mild steel and are mounted on the backing member 20, by suitable means, such as screws or bolts 25, extending through the bases 22.

In addition to the supporting members 9, each of the side pads 6 and 7 embodies a pad unit 26. The pad units 26 are identical in construction, and each includes an elongated backing member or backing plate 27. The backing members 27 may be made of any suitable material, such as, for example, wood or steel, or the like, but, preferably, are made from a suitable wooden material, such as, for example, the aforementioned wood planking.

Each of the pad units 26 also includes a core 28 and a cover member 29, FIG. 7, which extend the full length of the backing member 27. The core 28 may be made of any suitable material, such as, for example, any suitable natural or synthetic compressible, resilient resin or polymer, the preferred material being a foamed polyester. Similarly, the cover or casing 29 may be made of any suitable material, but preferably is made of a flexible, water-repellent, wear-resistent material, such as, for example, canvas duck or rubber impregnated nylon fabric.

In each of the pad units 26, the core 28 preferably is substantially square in transverse cross-section, and has one face 30 thereof, FIG. 9, secured by a suitable adhesive, not shown, to one face 31 of the respective backing member 27, in substantially flat juxtaposition thereto.

Each of the covers 29 includes a front wall 32 and two side walls 33 and 34, with the side walls 33 and 34 extending rearwardly from opposite side edges of the front wall 32 in substantially parallel relation to each other. The covers 29 are disposed around the respective cores 28 in snug fitting relation thereto, and the longitudinal edge portions of the side walls 33 and 34 thereof, remote from the respective front walls 32, are secured to the longitudinal side edges of the respective backing members 27 by a suitable means such as nails or screws 35, FIGS. 5 and 6. Each of the covers 29, also includes end walls 36 and 37, FIG. 1, closing the top and the bottom thereof, respectively.

The head pad 5, like the side pads 6 and 7, also includes a pad unit 38. The pad unit 38 is of the same construction as the pad units 26, embodying a core 39 mounted on one face of an elongated backing member 40, and enclosed thereon by a cover member 41, FIG. 10, the cover 41 of the pad unit 38 embodying end walls 42 and 43 closing the ends of the latter.

Each of the side members or legs 15 and 16 of the mounting brackets 11–13 on the supporting members 9 embodies inner or rear, upwardly opening slots 44 in the upper longitudinal edge portion thereof, FIGS. 5 and 6, for a purpose which will be discussed in greater detail presently. The slots 44 in the side members 15 are disposed in vertical alignment with each other, as are the slots 44 in the side members 16, with the slots 44 in the side members 15 and 16 of each of the individual brackets 11–13 being disposed in horizontal alignment with each other.

In addition, the side members 15 and 16 of each of the mounting brackets 11–13 embody outer or front, upwardly opening, horizontally aligned slots 45, 46 and 47, respectively, in the upper longitudinal edge portions thereof, FIGS. 5 and 6, the slots 45–47 being spaced outwardly away from the respective backing members 10 a greater distance than the slots 43. In the preferred form of the loading dock shelter 1, the slots 45–47 are spaced an equal distance from the slots 43 in the respective mounting brackets 11–13, with the slots 45 being of the same size and configuration as the slots 43; the slots 46 having substantially twice the lateral width of slots 45, FIGS. 5 and 6; and, the slots 47 being substantially L-shaped, as viewed in FIGS. 5 and 6, and having substantially the same lateral width as the slots 46. As may be seen in FIGS. 5 and 6, each of the slots 47 embodies a front edge portion 48 which opens outwardly through the upper edge portion of the respective side member 15 or 16 of the mounting bracket 13, and a lower portion 49, which projects rearwardly from the lower end of the front edge portion 48 in downwardly spaced relation to the upper edge of the respective side member 15 and 16.

Each of the pad units 26 of the side pads 6 and 7 embodies three hanger members 50 mounted on the face of the backing member 27 remote from the core 28, in spaced relation to each other, costly. 5 and 6. The hanger members oscillator, are identical in construction, each embodying an elongated rod 51 secured to a bracket 52 secured to the respective backing member 27 by suitable means such as bolts 53, as shown in FIG. 7. The rods 51 are disposed substantially perpendicular to the length of the respective backing members 27, and project laterally outwardly from both sides thereof. The hanger members 50 are so spaced from each other longitudinally of each of the backing members 27 as to space the rods 51 from each other distances corresponding to the spacing of the upper edges of the side members 15 and 16 of the mounting brackets 11–13.

With this construction, it will be seen that the pad units 26 of the side pads 6 and 7 may be disposed in one operative position on their respective supporting members 9 in which the rods 51 of respective hangers 50 rest in the inner or rear slots 44 in the mounting brackets 11–13, respectively, to thereby releasably support the pad units 26 in relatively closely adjacent relation to the side wall 2 of the warehouse 3, FIG. 6. The slots 44 are so disposed in the mounting brackets 11–13, that when the rods 51 are thus positioned in the slots 44, the front of the pad units 26, as defined by the front walls 31 of the cover members 29 thereof, are disposed in inwardly or rearwardly spaced relation to the front edge portion of the bumper 8, as shown in FIG. 4.

When it is desired to move the pad units 26 of the side pads 6 and 7 into position wherein they project forwardly or outwardly of the bumper 8, they may be lifted upwardly to thereby disengage the FIGS. 51 from the respective slots 44, 50 moved outwardly into position to dispose the upper rod 51 over the slot 45, the intermediate or central rod 51 over the slot 46, and the lower rod 51 over the front edge portion 48 of the slot 47. The pad units 26 may then be lowered so as to dispose the upper, intermediate and lower rods 51 in the slots 45–47, respectively, and the lower end portions of the pad units 26 may then be swung rearwardly or inwardly toward the warehouse 3, around the upper rods 51, to thus dispose the intermediate rod 51 in the rear edge portions of the slots 46, and dispose the lower most rod 51 in the rear end portions 49 of the slots 47. In this position of the pad units 26, the rear end portions 49 of the slots 47 act as a latch for preventing the pad units 26 from being moved upwardly out of the slots 45–47 by straight vertical movement thereof, the portions of the side members 15 and 16 of the mounting brackets 13, which define the upper portions of the rear end portions 49 of the slots 47, overlying the lower most rods 51 so as to prevent such vertical upward movement of the pad units 26. Thus, it will be seen that, if, when the pad units 26 are disposed in the aforementioned outer or front position, they are engaged by a truck, or the like, upward and downward movement of the rear end portion of the truck, such as often occurs during loading and unloading of a truck, will be ineffective to disengage the pad units 26 from their supported position on the mounting brackets 11–13.

In the aforementioned outer or front position of the pad units 26, the front faces thereof, as defined by the front walls 32 of the respective cover members 29 thereof, project outwardly or forwardly beyond the front face of the bumper 8, as illustrated in FIGS. 1 and 3. In such position, it will be seen that the side pads 6 and 7 are disposed in operative position for sealingly engaging the rear edge portion of a truck backed into loading position relative to the doorway 4 of the warehouse 3, against the bumper 8.

The pad unit 38 of the head pad 5, in the preferred form of of the invention shown in the drawings, is fixedly mounted on the mounting brackets 21 of the supporting member 19, in forwardly or outwardly projecting relation thereto, by suitable means such as, bolts 54 extending through the upper and lower legs 23 and 24 of the brackets 21 into corresponding upper and lower legs 55 and 56, respectively, of brackets 57 secured to the rear face of the backing member 40 of the pad unit 38. In such position, the pad unit 38 projects outwardly from the supporting member 19 and the warehouse wall 2 such a distance that the front or outer face thereof, as defined by the front wall of the cover 41 thereof, is disposed in uniplanar relation to the front faces of the pad units 26 of the side pads 6 and 7, when the latter are disposed in their outer or front position as shown in FIGS. 1 and 3. In such position of the pad unit 38, it projects outwardly or forwardly beyond the front face of the bumper 8, and is disposed in position wherein the front face of the pad unit 38 may be sealingly engaged by the top of the rear end of a truck disposed in normal operative position relative to the doorway 4, for loading and unloading the truck therethrough, the pad unit 38 being held outwardly by the brackets 21 against the compressive force exerted by the truck engaged therewith.

As will be appreciated by those skilled in the art, the showing of the pad unit 38 being mounted in fixed position on the brackets 21 is merely by way of illustration of the preferred form of the present invention, and is not by way of limitation, and, if desired, the pad unit 38 may be hingedly mounted on the brackets 21 in the manner of the pad unit of the head pad shown in our aforementioned patent application, Ser. No. 456,011, without departing from the purview of the broader aspects of the present invention.

It will be observed that the loading dock shelter 1 is of the type which may be termed "pad-type." That is, it embodies fabric or sheet material affording the casing of a pad or pillow, or the like, as distinguished from fabric or sheet material affording walls and curtains supported in more or less tent-like or drape-type manner.

Warehouse doorways of the type involved herein, are commonly of substantial size, such as, for example, being ten or twelve feet high and eight or nine feet wide, in the preferred form of the present invention, the loading dock shelter 1 is of such size that it will completely surround the top and sides of such a doorway. Bumpers used with warehouse doorways, such as, for example, the bumpers 8 shown in FIGS. 1 and 3, commonly project outwardly away from the warehouse wall in a substantial distance, such as, for example, seventeen inches, or the like. In the preferred form of the present invention, when the side pads 6 and 7 of the loading dock shelter 1 are disposed in extended position, the head pad 5 and the side pads 6 and 7 project outwardly from the warehouse wall a sufficient distance so as to afford compression of 2 to 3 inches of the core 28 of the side pads 6 and 7 and of the core 39 of the head pad 5 by the rear end of a truck backing into engagement with the bumper 8 in operative position for loading and unloading the truck through the doorway 4, the cores 28 and 39 having a normal, uncompressed width and thickness in the nature of 10 to 12 inches; and, when the pads 26 of the side pads 6 and 7 are disposed in retracted position, as shown in FIG. 4, the front faces thereof afforded by the front walls 32 of the covers 29, are spaced from the rear end of such a truck, disposed in the aforementioned loading and unloading position, a distance of not less than 2 inches. Such spacing of the side pads 6 and 7 from such a truck, when pads are in retracted position, affords ventilation between the truck and the warehouse wall 2.

Each of the side pads 6 and 7 embodies two side curtains or cover members 58 and 59 mounted on opposite sides of the respective supporting members 9 in position to be normally disposed in overlying relation to the outer faces of the side members 15 and 16, respectively, of the mounting brackets 11–13 thereof, FIG. 9. The cover members 58 and 59 are of such length that they extend the full length of the side pads 6 and 7. They may be made of any suitable material, such as, for example, a sheet of self-supporting material, such as, for example, a translucent sheet of material comprising a composition of a resin reinforced with glass fibers, readily available on the market, or a sheet of suitable flexible material, such as, for example, the aforementioned canvas duck or rubber-impregnated nylon fabric from which the covers 29 and 41 of the pad units 26 and 38, respectively, are made. In the preferred form of the invention shown in the drawings, the cover members 58 and 59 are made from flexible material, and are secured at one longitudinal edge portion to the adjacent longitudinal edges of the respective backing members 10 by suitable means such as nails or screws 60, FIG. 9. Elongated molding clips or retainer members 61, made of suitable material, such as, for example, steel or aluminum, are mounted on the other longitudinal edge portions of the side curtains 58 and 59. Each of the molding clips 61 has a channel 62 formed in and extending the full length of one longitudinal edge portion thereof, and in the assembled side pads 6 and 7, beads 63, which are formed on the longitudinal edge portions of the side curtains 58 and 59 remote from the backing members 27 are disposed in the channels 62 to retainingly attach the clips 61 thereto, each of the beads 63 having a core 64, made of suitable material such as rope, disposed therein so as to afford a snug fit between the beads 63 and the channels 62. Each of the clips 61 has a leg portion 65 which projects away from the channel 62, for a purpose which will be discussed in greater detail presently.

Each of the legs 15 and 16 of the brackets 11–13 has a substantially L-shaped bracket member 66 mounted on the longitudinal free edge portion thereof, remote from the base 14, FIG. 8. Each bracket member 66 embodies two legs 67 and 68 disposed substantially perpendicularly to each other and the free ends of the legs 67 are secured to the inner faces of the respective legs 15 and 16 of the brackets 11–13 by suitable means, such as, for example, welding in such position that the legs 68 project outwardly along the inner faces of the respective legs 15 and 16, in inwardly spaced, substantially parallel relation thereto, and terminate at their free edges in uniplanar relation to the longitudinal free edges of the legs 15 and 16, to thereby afford a slot 69 which opens outwardly or forwardly away from the base 14 of the respective one of the brackets 11–13, FIG. 8. Preferably, the bracket members 66 extend the full vertical height to the legs 15 and 16 to thereby afford slots or recesses 69 which extend the full vertical heights of the brackets 11–13.

Although the slots 69 are shown in the drawings as being afforded by bracket members secured to the legs 15 and 16, it will be appreciated that this is merely by way of illustration and not by way of limitation, and that the slots 69 can be otherwise afforded, such as, for example, forming the members 66 integrally with the respective legs 15 and 16, without departing from the purview of the broader aspects of the present invention.

In the assembled loading dock shelter 1, the side curtains 58 and 59 are disposed in overlying relation to the side members 15 and 16 of the brackets 11–13, and the channel members 61 extend around the free edge portions of the legs 15 and 16, remote from the base members 14, with the channels 62 disposed in abutting engagement with the free edges of the legs 15 and 16 and with the legs 65 disposed in the slots 69, afforded by the legs 15 and 16 and the bracket members 66 disposed thereon, FIG. 9. Preferably, the slots 69 are of such width, and the legs 65 of clips 61 are of such thickness that the legs 65 are received in the slots 69 with a relatively snug, frictional fit.

In assembling the side pads 6 and 7, when the cover members 58 and 59 are made from the aforementioned flexible material, the clips 61 thereon may first be inserted into the slots 69 in the brackets 11–13, after the latter have been mounted on the respective backing members 10, and the opposite longitudinal edge portions of the cover members 58 and 59 may then be secured to the adjacent outer longitudinal edges of the respective backing members 10 by the aforementioned nails or screws 60. With this construction, when the pad units 26 of the side pads 6 and 7 are moved inwardly and outwardly between the aforementioned extended and retracted positions shown in FIGS. 3 and 4, respectively, such movement takes place between the legs 68 of the brackets 66 disposed on opposite sides of the bracket members 11–13 so that the clips 61 are protected against any substantial frictional engagement by the pad units 26 during such movement of the latter, thereby insuring that the clips 61 will not be dislodged from their latching engagement with the legs 15 and 16 of the mounting brackets 11–13.

Also, when the cover members 58 and 59 are formed from the aforementioned self-supporting material, the securing of the rear edge portions thereof to the adjacent side edges of the backing members 10, by such means as the aforementioned nails or screws 60, may be dispensed with, the engagement of the clips 61 around the free edges of the side legs 15 and 16 and in the slots 69 being sufficient to support the relatively stiff, self-supporting cover members 58 and 59 in the desired overlying relation to the outer faces of the legs 15 and 16 of the mounting brackets 11–13. When such self-supporting material is used for the cover members 58 and 59, beads, such as the beads 63 may be formed, if desired on the longitudinal edges thereof remote from the backing members 10, and the clips 61, under such circumstances, may be mounted on the self-supporting cover members 58 and 59 in the same manner as heretofore described with respect to the cover members, when the latter are made from flexible sheet material. However, if desired, the clips 61 may be secured to the cover members 58 and 59, made of such self-supporting material, by other suitable means, such as, for example, securing the clips thereto by screws or rivits.

In the assembled loading dock shelter 1, cover members in the form of elongated sheets or panels 70 and 71, which extend the full length of the head pad 5, are mounted on the head pad 5 in covering relation to the outer faces of the legs 23 and 24 of the brackets 21, FIG. 10. The cover members 70 and 71 may be made of any suitable material such as, for example, the aforementioned canvas duck or rubber-impregnated nylon fabric, and may be secured to the head pad 5 by suitable means such as screws or nails 72 attaching the cover members 70 and 71 to the backing members 20 and 40, FIG. 10.

From the foregoing it will be seen that the present invention affords a novel loading dock shelter of the pad type, which embodies a novel side pad construction.

Also, it will be seen that the present invention affords a novel loading dock shelter of the pad type wherein cover members for the supports for the side pads may be constituted and arranged in a novel and expeditious manner.

Also, it will be seen that the present invention affords a novel loading dock shelter of the pad type which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
 a. a head pad for extending along the top of a doorway in a warehouse wall,
 b. two side pads for extending along the sides of such a doorway,
 c. means for supporting said side pads on such a wall,
 d. said means comprising bracket means
  1. for projecting outwardly from said wall, and
  2. having outer edge portions on the side thereof remote from said wall, when said bracket means is disposed in operative position on said wall,
 e. said outer edge portions having recesses therein opening outwardly away from said wall when said bracket means is disposed in said operative position, and
 f. cover means for covering said bracket means and having
  1. inner edge portions adapted to be disposed adjacent to said wall, and
  2. other edge portions, remote from said inner edge portions and adapted to be mounted in said recesses for securing said cover means to said bracket means.

2. A loading dock shelter as defined in claim 1, and in which
 a. said other edge portions are adapted to be releasably mounted in said recesses.

3. A loading dock shelter as defined in claim 1, and in which
 a. said bracket means includes outer faces,
 b. said recesses are disposed adjacent to edge portions of respective ones of said outer faces in substantially parallel relation thereto, and
 c. said cover means is disposed in overlying juxtaposition to said outer faces when said cover means is disposed in covering relation to said bracket means.

4. In a loading dock shelter of the type embodying pad means for extending across the top and along the side of a doorway in a warehouse wall,
 a. an elongated side pad for extending along one side of such a doorway,
 b. means adapted to be mounted on such a wall for operatively supporting said side pad along said one side of said doorway therein,
 c. said means having
  1. an outer face disposed in position to project outwardly from such a wall when said means is so mounted on said wall and having
   a. an edge portion adapted to be disposed adjacent to said wall when said means is so mounted on the latter, and
   b. another edge portion remote from said first mentioned edge portion, and
  2. a recess
   a. in an edge portion thereof, and
   b. disposed adjacent to said other edge portion, and d. means adapted to be mounted on said first mentioned means in covering relation to said outer face, and
 e. said second mentioned means having an edge portion adapted to be releasably engaged in said recess for releasably securing said second mentioned means to said first mentioned means.

5. The combination defined in claim 4, and in which
 a. said recess
  1. is disposed in substantially parallel relation to said face, and
  2. opens outwardly in a direction facing away from said wall when said first mentioned means is so mounted on said wall, and
 b. said edge portion of said second mentioned means is bent around said first mentioned edge portion of said outer face when said edge portion of said second mentioned means is so engaged in said recess.

6. In a loading dock shelter of the type embodying pad means adapted to be disposed adjacent to a doorway in a warehouse wall,
 a. an elongated side pad for extending along one vertical side of such a doorway,
 b. supporting means adapted to be mounted on such a wall for supporting said side pad in such position along said doorway therein,
 c. said supporting means comprising a plurality of substantially U-shaped brackets, each having
  1. a base portion, and
  2. two legs projecting
   a. outwardly from opposite sides of said base portion,
   b. in substantially parallel relation to each other,
 d. said supporting means including means for securing said brackets to such a wall
  1. in spaced relation to each other along said side of said doorway therein, and
  2. with
   a. said base portions disposed in substantially parallel relation to said wall, and
   b. said legs on respective sides of said base portions projecting outwardly from said wall in substantially uniplanar relation to each other,
 e. one leg on certain of said brackets having a recess
  1. in the edge portion thereof remote from said base of the respective ones of said brackets,
  2. extending the full length of said last mentioned edge portion, and
  3. opening outwardly away from said last mentioned base,
 f. an elongated cover member, and
 g. means on one longitudinal edge of said cover member for engagement in said recesses in said certain brackets for supporting said cover member in overlying covering relation to the faces of said one legs of all of said brackets remote from the other legs thereof.

7. The combination defined in claim 6, and in which
 a. said one leg of said certain brackets comprises
  1. a panel member, and
  2. a portion on the face of said panel member, facing toward the other leg of each respective certain bracket, projecting toward said other leg of said respective certain bracket, and
 b. said panel member and said portion of each of said last mentioned one legs define opposite sides of said recess therein.

8. The combination defined in claim 6, and in which a. said cover member comprises an elongated sheet of self-supporting material.

9. The combination defined in claim 6, and in which
   a. said supporting means includes a backing plate,
   b. said brackets are mounted on said backing plate,
   c. said cover member comprises an elongated sheet of flexible material, and
   d. the longitudinal edge of said cover member remote from said one longitudinal edge thereof is secured to said backing plate.

10. The combination defined in claim 6, and in which
    a. said means on one longitudinal edge of said cover member
       1. is substantially U-shaped,
       2. has one leg secured to said one longitudinal edge of said cover member in outwardly disposed relation to said faces of said one legs of said brackets, and
       3. has the other leg disposed in said recesses.

* * * * *

UNITED STATES PATENT AND TRADEMARK OFFICE
CERTIFICATE OF CORRECTION

PATENT NO. : 3,935,684
DATED : Feb. 3, 1976
INVENTOR(S) : Cyril P. Frommelt; Sylvan J. Frommelt It is certified that error appears in the above-identified patent and that said Letters Patent are hereby corrected as shown below:

Col. 2, line 3, after "5" delete --4--;

Col. 4, line 47, "costly" should be --Figs.--;

Col. 4, line 48, "oscillator" should be --50--;

Col. 5, line 10, "Figs" should be --rods--; and

Col. 5, line 11, after "44" delete "50" and insert --and--.

Signed and Sealed this eleventh Day of May 1976

[SEAL]

Attest:

RUTH C. MASON
Attesting Officer

C. MARSHALL DANN
Commissioner of Patents and Trademarks